United States Patent [19]

Shiga et al.

[11] Patent Number: 5,475,043

[45] Date of Patent: Dec. 12, 1995

[54] MATERIAL WITH VARIABLE VISCOELASTICITY

[75] Inventors: Tohru Shiga; Norio Sato; Yoshiharu Hirose; Akane Okada; Takashi Ohta; Toshio Kurauchi, all of Aichi, Japan

[73] Assignee: Kabushiki Kaisha Toyota Chuo Kenkyusho, Aichi, Japan

[21] Appl. No.: 285,776

[22] Filed: Aug. 4, 1994

Related U.S. Application Data

[63] Continuation of Ser. No. 26,211, Mar. 2, 1993, abandoned, which is a continuation of Ser. No. 575,825, Aug. 31, 1990, abandoned.

[30] Foreign Application Priority Data

Sep. 2, 1989 [JP] Japan .................................. 1-227817

[51] Int. Cl.$^6$ ........................................................ C08K 5/00
[52] U.S. Cl. ..................... 524/176; 524/401; 524/406; 524/413; 524/422; 524/439; 525/101; 525/150; 525/179; 525/184; 525/212; 525/219; 525/221
[58] Field of Search ............................. 524/176, 401, 524/406, 413, 422, 439; 525/101, 150, 179, 184, 212, 219, 221

[56] References Cited

U.S. PATENT DOCUMENTS

| | | | |
|---|---|---|---|
| 3,512,876 | 5/1970 | Marks | 350/267 |
| 4,072,411 | 2/1978 | Frank et al. | |
| 4,574,161 | 3/1986 | Marks | 136/263 |
| 5,047,162 | 9/1991 | Krug et al. | 252/62.9 |
| 5,225,109 | 7/1993 | Feldhues et al. | 252/500 |
| 5,296,974 | 3/1994 | Tada et al. | 359/885 |

FOREIGN PATENT DOCUMENTS 4731  1/1986  Japan.

*Primary Examiner*—Peter D. Mulcaby
*Attorney, Agent, or Firm*—Oblon, Spivak, McClelland, Maier & Neustadt

[57] ABSTRACT

A material with variable viscoelasticity is composed of an electrically insulating polymeric material, and fine particles dispersed therein and capable of electric polarization under an applied electric field. The particles may, for example, be of a conjugated and unsaturated organic compound, a polyelectrolyte, or an organometallic complex salt. The material is capable of a reversible change of viscoelasticity depending on the intensity of the applied electric field.

14 Claims, No Drawings

MATERIAL WITH VARIABLE VISCOELASTICITY

This application is a Continuation of application Ser. No. 08/026,211, filed on Mar. 2, 1993, now abandoned, which is a continuation of application Ser. No. 07/575,825, filed on Aug. 31, 1990 now abandoned.

BACKGROUND OF THE INVENTION

1. Field of the Invention

This invention relates to a material with viscoelasticity variable in electric fields, and more particularly, a polymeric material having variable viscoelasticity and suitable for use in making, for example, automobile parts adapted for the transmission or absorption of energy, or the isolation of vibration, such as clutches, dampers, shock absorbers, and engine mounts.

2. Description of the Related Art

Polymeric materials which can convert light, heat, electrical, or other energy into mechanical energy have recently come to be used for a wide variety of applications. In the automobile industry, too, there has been a demand for materials which can change their hardness, or viscoelasticity, as required, for making clutches, shock absorbers, engine mounts, and other automobile parts for the transmission or absorption of energy, or the isolation of vibration. The aforementioned polymeric materials have been expected to satisfy such a demand.

Known polymeric materials capable of converting electrical energy into mechanical energy are those which shrink (as disclosed in Japanese Laid-open Patent Publication No. 151824/1987), or bend, or bend and straighten (as disclosed in Japanese Laid-open Patent Publication No. 4731/1986), in response to an electric signal. These materials, however, consist of a polymer gel which is deformed by releasing a solvent from its solution subjected to electrical excitation, or by absorbing a solvent from an external source, thus causing volumeric change. None of these materials can, therefore, be used for making clutches, dampers, engine mounts, or any other automobile part that relies upon a change in hardness or viscoelasticity of the material for performing the transmission or absorption of energy, etc.

SUMMARY OF THE INVENTION

It is, therefore, an object of this invention to provide a polymeric material which can change its viscoelasticity without undergoing any change in volume.

This object is essentially attained by a material which comprises an insulating polymeric material, and fine particles capable of electric polarization by an electric field, dispersed in the polymeric material.

Other objects, features and advantages of this invention will become apparent from the following description.

DETAILED DESCRIPTION OF THE INVENTION

According to this invention, there is provided a material with variable viscoelasticity which comprises an electrically insulating polymeric material, and fine particles dispersed therein and capable of electric polarization in an electric field, and which can thus change its viscoelasticity by the application of the electric field without changing its volume.

The material with variable viscoelasticity of this invention is a polymeric material which undergoes a reversible change in viscoelasticity in accordance with the intensity of an applied electric field.

The insulating polymeric material is preferably of the type which exhibits high flexibility at room temperature, or at any other temperature at which the material with variable viscoelasticity is used. From a macroscopic standpoint, it is preferable to use a material in the form of a flexible gel or elastomer, and from a microscopic standpoint, it is preferable to use a polymer having a crosslinked network or having an entangled structure, or a polymer which is self-crosslinked or crosslinked by particles which are dispersed in it. Specific examples of the preferred polymers include silicone, butadiene or isoprene rubber which is in the form of an elastomer or gel at room temperature, a gel of any such rubber swollen in a solvent, and polystyrene which forms an elastomer or gel at a working temperature. The insulating property of any such polymeric material is not very critical, but it may have some conductivity which is of a level not exerting any adverse effect on the electric polarization of the fine particles in an electric field.

The fine particles may be of any material if it undergoes electric polarization upon the action of an electric field. The use of a low conductive material is preferred because a high conductive material, such as a metal, or doped semiconductive polymer, gives rise to a relatively large consumption of electricity in applying the voltage and thus a higher cost of operation. Particularly, conductive material is not sufficiently practical in case of a limited availability of electricity, e.g. for use as a clutch, engine mount, etc. of an automobile where only a battery is available as a power source. Preferred examples of the materials for the fine particles are conjugated organic molecules having unsaturated bonds such as polypyrrole, poly-p-phenylenes, and polythiophene; polyelectrolytes such as poly(lithium methacrylate) and polymethacrylic acid cobalt(II) salt; organometallic complex salts such as phthalocyanine and ferrocene; silicone resins; ion exchange resins; alkaloids such as quinine and cinchonidine; and inorganic materials such as silica, barium titanate and zeolite. One or more of these materials are selected depending on the insulating polymeric material to be used. When, for example, a polyelectrolyte, or ion exchange resin is used, it is preferable to have it adsorb several per cent of water to promote its electric polarization.

The fine particles undergo electric polarization as a result of displacement of π-electrons or ions in the particles, or of electric double layers on the particle surfaces under the influence of an applied electric field, and are thereby united together to form an electrically crosslinked structure which improves the viscoelasticity of the insulating polymeric material. The particles preferably have a diameter of about 0.01 to 500 microns, or more preferably, about 0.1 to 100 microns, to ensure the satisfactory formation of an electrically crosslinked structure. The particles are preferably so dispersed as to occupy about 1 to 80%, or more preferably, about 5 to 60%, by weight of the insulating polymeric material to ensure the formation of a satisfactory electrically-crosslinked structure and the manufacture of a satisfactorily soft and flexible material. Particles having a high aspect ratio are preferably used to ensure the formation of a satisfactory electrically-crosslinked structure.

Various methods can be employed for dispersing the fine particles in the insulating polymeric material. The optimum method depends on the polymeric material and fine particles which are used. Several examples are given below:

(1) Fine particles are mixed previously in a reactive monomer, a solution thereof, or a solution of a reactive polymer, and heat or light is applied to the mixture to cause polymerization and solidification, whereby an insulating polymeric material in which the fine particles are dispersed is obtained;

(2) Fine particles are kneaded into a gel of an insulating polymeric material by e.g. a rubber roller;

(3) A reactive solution for forming fine particles is mixed with an insulating polymeric material, and is caused to undergo reaction and solidification, whereby fine particles are formed in the polymeric material;

(4) A solution of fine particles is mixed with an insulating polymeric material and the solvent is removed from the solution, whereby the fine particles are precipitated and dispersed in the polymeric material;

(5) A crosslinked insulating polymeric material is dipped in a suspension of fine particles to absorb the suspension;

(6) A solution or suspension of an insulating polymeric material is mixed with a solution or suspension of fine particles and the solvents are removed from the mixture.

In the absence of any applied electric field, the material with variable viscoelasticity of this invention has viscoelasticity which depends solely upon the physical properties of the insulating polymeric material and its physical and chemical relations with the fine particles dispersed therein. Upon application of an electric field, however, the fine particles undergo electric polarization immediately to form electrical bonds which contribute to raising the viscoelasticity of the material as a whole rapidly. Upon removal of the electric field, the electrical bonds of the fine particles are immediately broken and the polymeric material restores its original viscoelasticity rapidly. The individual particles are capable of polarization in an electric field with only a slight intensity and the resulting electrical bonds enable a great increase in viscoelasticity of the polymeric material. Only a very low current density is sufficient if the particles are of a low conductive material.

The viscoelasticity of a polymeric material is expressed by a complex number, of which the real part reflects its elasticity and defines its dynamic modulus, while the imaginary part thereof reflects its viscosity and defines its loss modulus. According to this invention, both of the dynamic and less moduli of the material can be changed in an electric field. A change in its dynamic modlus gives rise to a change in its property of transmitting energy, while a change in its loss modulus brings about a change in its property of absorbing energy. The material of this invention is normally a soft polymeric material, but changes to a hard material polymeric by increasing both of the elasticity and viscosity when only a very small amount of electricity is applied to it. This change is reversible, and even the continuous application of an electric field does not cause any reduction in the increase in viscoelasticity of the material, or its response speed. Therefore, the material of this invention is particularly beneficial when used for making, for example, clutches, dampers, or any other automobile part for the transmission or absorption of energy, or the isolation of vibration.

The change in viscoelasticity of the material of this invention depends on the voltage which is applied to it and therefore can be controlled as desired.

EXAMPLES

The invention will now be described more specifically with reference to several examples thereof. Four kinds of materials with variable viscoelasticity embodying this invention were prepared as will hereinafter be described in EXAMPLES 1 to 4, respectively, and were each evaluated for a change in viscoelasticity. The evaluation was made by using a viscoelastic spectrometer which had been supplied by Iwamoto Seisakusho Co., Ltd. Each material to be evaluated was sandwiched with the separation of 1 mm between two outer plates and an inner plate. While the inner plate was vibrated by a shear strain of 0.1 at a frequency of 0.1 Hz, a DC voltage of 0–4 kV was applied between the two plates and the resulting increase of torque acting upon the outer plates was measured. The amounts of dynamic shear modulus and loss shear modules were calculated from the amounts of torque and the change in modulus of the material was obtained from the ratio of the moduli before the application of the electric field to those after the application thereof.

EXAMPLE 1

Eight grams of poly(sodium methacrylate) particles having a diameter of 50 microns and an adsorbed water content of 11.2% by weight were mixed in 20 g of a commercially available two-part reactive silicone rubber solution, and the solution was heated to undergo reaction, whereby a material with variable viscoelasticity was prepared.

When a voltage of 4 kV was applied to the material, it showed a dynamic shear modulus which was 10 times as high as the original value, and a loss shear modulus which was six times as high. Upon removal of the electric field, the material restored its original dynamic and loss shear moduli of $1.1 \times 10^4$ and $8.4 \times 10^3$ dynes/cm$^2$, respectively.

EXAMPLE 2

Ten grams of silicone oil and 6 g of poly(sodium methacrylate) particles having a diameter of 50 microns and an adsorbed water content of 9.7% by weight were mixed in 20 g of the same reactive silicone rubber solution as had been used in EXAMPLE 1, and the mixture was heated to undergo reaction, whereby a material with variable viscoelasticity was prepared. When a voltage of 2 kV/mm was applied to the material, it showed a dynamic shear modulus which was 20 times as high as the original value, and a loss shear modulus which was 14 times as high.

EXAMPLE 3

Two and a half grams of poly-p-phenylene particles having a diameter of one micron which had been obtained by polymerizing benzene in the presence of aluminum chloride and copper(II) chloride were mixed in 16 g of the same reactive silicone rubber solution as had been used in EXAMPLE 1, whereby a material with variable viscoelasticity was prepared. When a voltage of 4 kV/mm was applied to the material, it showed a dynamic shear modulus which was 3.5 times as high as the original value, and a loss shear modulus which was twice as high.

EXAMPLE 4

Two and a half grams of poly-p-phenylene particles were dispersed in 100 ml of toluene mixed with 10 g of isoprene rubber, and the toluene was removed from the dispersion, whereby a viscoelasticity changeable material was prepared. When a voltage of 5 kV/mm was applied to the material, it showed a dynamic shear modulus which was 50% higher than the original value, and a loss shear modulus which was 10% higher.

What is claimed is:

1. A material with electric field dependent viscoelasticity comprising a flexible electrically insulating polymeric material and fine particles uniformly dispersed in said polymeric material and occupying 5 to 60% by weight with respect to said polymeric material, said particles being capable of having polarizing induced by an external electric field and present in an amount capable of forming an electrically-crosslinked structure along the direction of said external electric field within said polymeric material and altering the viscoelasticity of said polymeric material by the use of force generated by electrically polarized particles, said polarization disappearing in the absence of said external electric field.

2. The material according to claim 1, wherein said material is capable of a reversible change of viscoelasticity in an electric field depending on the level of applied voltage.

3. The material according to claim 1, wherein said particles consist essentially of a low conductive material.

4. The material according to claim 3, wherein said particles consist essentially of a conjugated organic compound.

5. The material according to claim 4, wherein said organic compound is selected from the group consisting of polypyrroles, poly-p-phenylenes, and polythiophenes.

6. The material according to claim 1, wherein said particles consist essentially of a polyelectrolyte.

7. The material according to claim 6, wherein said polyelectrolyte is selected from the group consisting of metal salts of polymethacrylic acids.

8. The material according to claim 1, wherein said particles consist essentially of an organometallic complex salt.

9. The material according to claim 1, wherein said polymeric material is in form of a gel or an elastomer.

10. The material according to claim 1, wherein said polymeric material has a crosslinked network structure.

11. The material according to claim 1, wherein said particles have a diameter of about 0.01 to 500 microns.

12. The material according to claim 11, wherein said diameter is from 0.1 to 100 microns.

13. The material according to claim 1, wherein the flexible electrically insulating polymeric material is selected from the group consisting of silicone rubber, butadiene rubber, isoprene rubber and polystyrene.

14. The material according to claim 1, wherein said flexible electrically insulating polymeric material is silicone rubber and wherein said fine particles consist essentially of poly-p-phenylenes.

* * * * *